United States Patent
Hicklin et al.

(10) Patent No.: US 8,346,793 B1
(45) Date of Patent: Jan. 1, 2013

(54) TECHNIQUES FOR SUGGESTING CORRECT IDENTIFIERS

(75) Inventors: Joe F. Hicklin, Upton, MA (US); Audrey L. Benevento, Waltham, MA (US)

(73) Assignee: The MathWorks, Inc., Natick, MA (US)

( * ) Notice: Subject to any disclaimer, the term of this patent is extended or adjusted under 35 U.S.C. 154(b) by 8 days.

(21) Appl. No.: 13/074,717

(22) Filed: Mar. 29, 2011

Related U.S. Application Data

(60) Provisional application No. 61/378,550, filed on Aug. 31, 2010.

(51) Int. Cl.
*G06F 7/00* (2006.01)

(52) U.S. Cl. ...................................................... 707/759

(58) Field of Classification Search .................. 707/722, 707/758, 759, 765, 769; 715/773, 257; 345/168, 345/173; 704/8
See application file for complete search history.

(56) References Cited

U.S. PATENT DOCUMENTS

| | | | | |
|---|---|---|---|---|
| 4,914,590 | A * | 4/1990 | Loatman et al. | 704/8 |
| 5,572,423 | A * | 11/1996 | Church | 715/257 |
| 7,880,730 | B2 * | 2/2011 | Robinson et al. | 345/173 |
| 7,920,132 | B2 * | 4/2011 | Longe et al. | 345/173 |
| 2007/0027858 | A1 | 2/2007 | Weinberg et al. | |
| 2008/0266261 | A1 * | 10/2008 | Idzik | 345/168 |
| 2008/0306895 | A1 * | 12/2008 | Karty | 706/52 |
| 2009/0199090 | A1 * | 8/2009 | Poston et al. | 715/255 |
| 2009/0284471 | A1 * | 11/2009 | Longe et al. | 345/168 |
| 2010/0257478 | A1 * | 10/2010 | Longe et al. | 715/773 |

OTHER PUBLICATIONS

Google, Google Suggest: Features—Web Search Help, available at http://www.google.com/support/websearch/bin/answer.py?hl=en-GB&answer=106230 (accessed Apr. 29, 2011).
Leaning the Bash Shell, 3$^{rd}$ edition, available at http://proquest.safaribooksonline.com/print?xmlid=0596009658/bash3-app-d (accessed Sep. 1, 2009).
Wikipedia, Command Line Completion, available at http://en.wikipedia.org/wiki/Command_line_completion (accessed Mar. 2, 2008).
Auto Completion, available at http://www.codebot.org/delphi/?doc=9451 (accessed Mar. 2, 2008).

* cited by examiner

*Primary Examiner* — Hung T Vy
(74) *Attorney, Agent, or Firm* — Venable LLP; Michael A. Sartori; Todd R. Farnsworth

(57) ABSTRACT

In an illustrative embodiment, an apparatus, computer-readable medium, or method may be configured to suggest correct identifiers. Expected identifiers may be created and their frequencies of occurrence may be calculated. Unrecognized identifiers may be detected. First numerical scores indicating that the unrecognized identifiers were provided in place of one or more expected identifiers may be calculated. Second numerical scores indicating that the unrecognized identifiers were intended to include expected identifiers may also be calculated. The second numerical scores may be calculated using the first numerical scores and the frequencies of occurrence of the expected identifiers. The system may select one or more expected identifiers based on the second set of numerical scores.

26 Claims, 11 Drawing Sheets

700

Entered Value 710

| | Q | w | W | e | E | ... |
|---|---|---|---|---|---|---|
| Q | 0 | 3 | 2 | 5 | 4 | |
| w | 3 | 0 | 1 | 2 | 3 | |
| W | 2 | 1 | 0 | 3 | 2 | |
| e | 5 | 2 | 3 | 0 | 1 | |
| E | 4 | 3 | 2 | 1 | 0 | |
| ... | | | | | | |

Meant to Type 720

FIG. 7

```
function [score,match] = bestErrorMatch(typedString)                    810
% Find the best legal string when the user mis-types
    persistent pWords allWords M gapOpen gapExtend
    if(isempty(pWords))
% legal matlab commands and their frequency
        Str = load('priors/priors.mat');
        pWords = Str.pWords;
        allWords = Str.allWords;
% Only repair to the most common N commands
        N = 4000;
        [~,I] = sort(pWords,'descend');
        pWords = pWords(I(1:N));
        allWords = allWords(I(1:N));
% a score matrix for matching mis-typed commands
        match    = log10(0.969);
        caseMiss = log10(0.010);
        close    = log10(0.010/6);
% because there are six close misses
        miss     = log10(0.001/120);
% because there are 128 - 8 misses
        gapOpen   = log10(0.005);
        gapExtend = log10(0.005);
        M = keyboardDistance({match, caseMiss,close,miss});
    end % All of the variables in the workspace are legal strings
% to type
    w = evalin('base','whos');
    workspaceVars = {w.name};
% Assume they are equally likely
    n = length(workspaceVars);
    pWorkspaceVars = ones(1,n)/n;
% All of the functions in the current directory are legit
% as well
    w = what;
    localFiles = [w.m;w.mex]';
    localFiles = regexprep(localFiles, '\..+','');
% strip suffix
% Also equally likely
    n = length(localFiles);
    pLocalFiles = ones(1,n)/n;
```

FIG. 8A

```
% group all the sources                                    820
    candidates = {workspaceVars,localFiles,allWords};
    pCandidates =
{pWorkspaceVars/3,pLocalFiles/3,pWords/3};
% calculate p(Ty | Sx) for each x
    scores = zeros(size(candidates));
    for i = 1:length(candidates)
        candidate = candidates{i};
        thisScore = affinegapmex(uint8(typedString),
uint8(candidate), gapOpen, gapExtend, M, 1);
% thisScore = simplegapmex (uint8(typedString),
uint8(candidate), gapOpen, M, 1);
        scores(i) = 10^thisScore;
% here we exponentiate so letter scores are multiplied not
added
    end % use Bayes theorem to combine score and prior
    pGuess = scores .* pCandidates / sum(scores .*
pCandidates);

% and the winner is...
    [score,i] = max(pGuess);
    match = candidates{i};
%% Some diagnostic output
%bar(scores)
    if(true)
        [yScore,iScore] = sort(pGuess, 'descend');
        fprintf('\n');
        for i = 1:1000
            if(yScore(i) < yScore(1)/100000)
                break;
            end
            index = iScore(i);
            fprintf('%s   %g %g %g\n', candidates{index},
yScore(i),scores(index),pCandidates(index));
        end
        fprintf('\n');
    end
```

FIG. 8B

TECHNIQUES FOR SUGGESTING CORRECT IDENTIFIERS

RELATED APPLICATIONS

This patent application claims the benefit of U.S. Provisional Patent Application No. 61/378,550, filed Aug. 31, 2010. U.S. Provisional Patent Application No. 61/378,550 is hereby incorporated by reference in its entirety.

BACKGROUND SECTION

Some computing systems may provide users with assistance while the user interacts with the computer. For example, some systems may provide spell checkers or auto completion functions for use with search applications.

Spell checkers may work by comparing a series of characters against each word in a dictionary (i.e., a list of correctly spelled words). Word processing applications, such as Microsoft® Word, may contain spell checking functionality that may identify a possibly misspelled word and may suggest possible correct spellings.

Google Suggest™, on the other hand, may provide a listing of possible search queries while a user is typing based on other search queries. One or more algorithms based on factors, such as the popularity of a particular search, may be used to populate the suggested search list. Additionally, Google Suggest™ may provide search alternatives if the search terms are potentially misspelled.

BRIEF DESCRIPTION OF THE DRAWINGS

The accompanying drawings, which are incorporated in and constitute a part of this specification, illustrate one or more embodiments of the invention and, together with the description, explain one or more illustrative embodiments of the invention. In the drawings.

FIG. 7 illustrates a portion of an example keystroke penalty matrix depicting mistyping penalties in an illustrative embodiment;

FIGS. 8A and 8B illustrate example software code that may implement an illustrative embodiment of the invention;

DETAILED DESCRIPTION

Overview

Information processing systems, such as text-based programming environments, may allow for the input of textual data. The inputted textual data may be transformed by the information processing system into another form of information (e.g., but not limited to, statistics, graphs, tables, graphics, etc.). Inputted textual data may include a finite number of identifiers which may be interpreted by the processing system. Identifiers may include, for example, global identifiers, global variables, global functions, global methods, global keywords, global commands, workspace variables, local commands, local keywords, local functions, local scripts, local variables, local methods, argument names, tokens stored in files, keywords, properties, properties of an object, and/or other lexical tokens recognized by the information processing system. For the information processing system to correctly interpret the identifier, the identifier may be required to contain the correct characters in the correct sequence. Additionally, information processing systems may be case sensitive. As such, the identifier may need to be in the correct type case. For example, if the identifier is misspelled or otherwise entered incorrectly the information processing system may not be able to correctly interpret the identifier.

Experienced users, especially novice users, may inadvertently enter identifiers incorrectly into the information processing system. Information processing systems may detect the incorrect identifier and request correction. However, information processing systems may not offer the user an accurate list of possible correct identifiers.

An example embodiment may assist in the selection of a correct identifier by displaying one or more possible identifiers after identifying an incorrect identifier. This illustrative embodiment may use one or more algorithms to determine the one or more possible identifiers to display. In this illustrative embodiment, prior statistics regarding the frequency of use for each expected identifier may be created. The frequency of use may be calculated using gathered data such as, for example, usage logs. Identifiers that do not appear in the usage logs may be assumed to be infrequently used identifiers and may be assigned a low probability. A string matching algorithm may be utilized which may compare the entered string with each expected identifier. Then, based on the frequency of use and the result from the string matching algorithm, another algorithm may compute a set of potential matches. These potential matches may be displayed to the user as possible alternatives to the mistyped or unrecognized identifier.

Illustrative Examples

Figure 1:
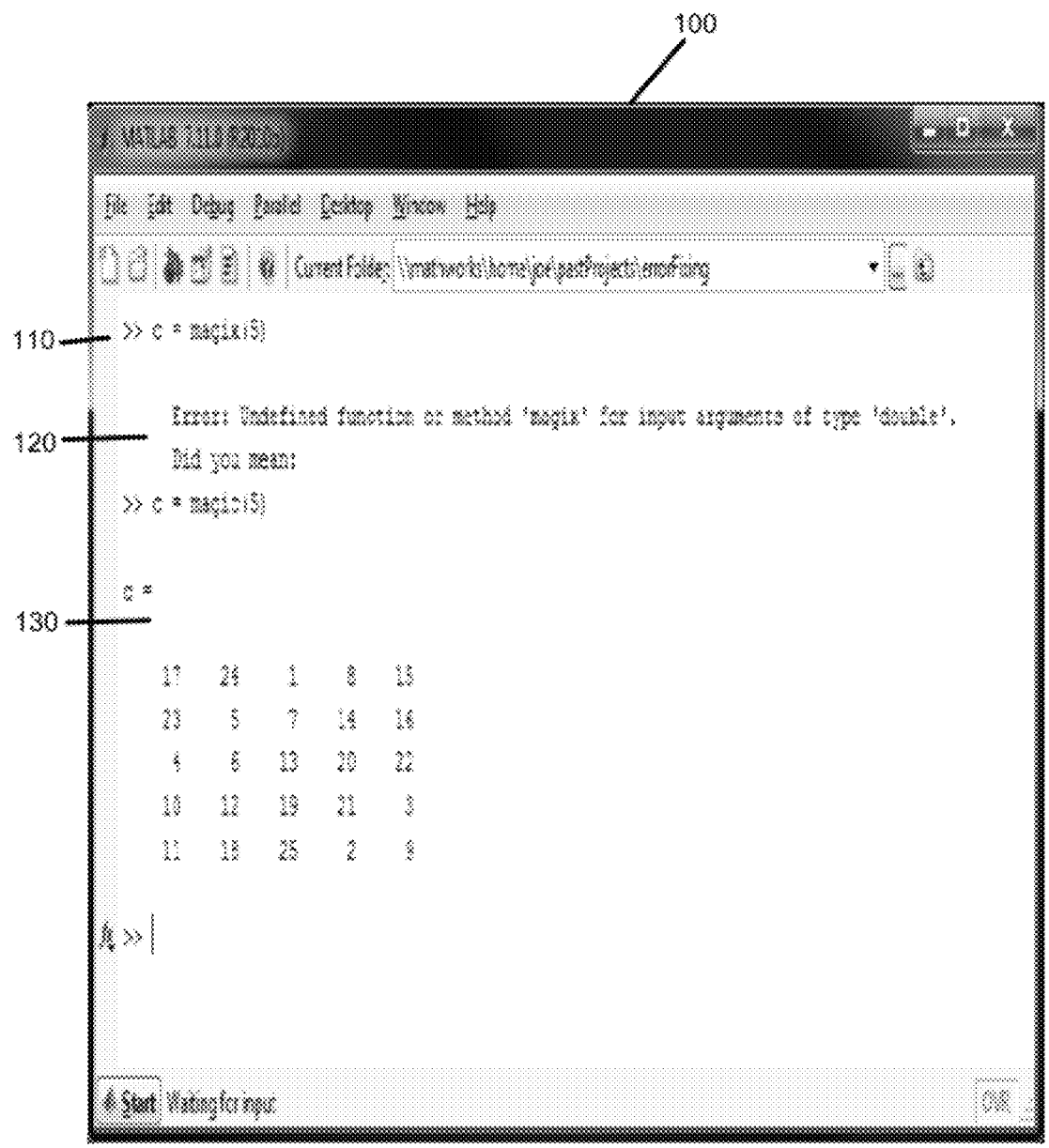
FIG. 1 illustrates an example screen-shot of a command-line interface configured to practice an illustrative embodiment.

FIG. 1 illustrates an example screen-shot of a command-line interface 100 configured to practice an illustrative embodiment. The example screen-shot of the command-line interface 100 depicts a user-entered string 110 (in this example, "c=magix(5)") as being entered into the command-line interface 100. In this illustrative embodiment, the information processing system may recognize "magix" in the user-entered string 110 as an unrecognized identifier. The system may evaluate the probability of all the possible alternatives and display the alternative with the highest probability of being the correct identifier 120 (in this example, "magic" replaces "magix" and displays "c=magic(5)"). In this illustrative embodiment, the suggested identifier was selected and the program continued 130.

Other illustrative embodiments of the invention may include alternative ways of displaying and selecting suggested identifiers. Such selections may include, for example, a list box, drop-down list, pop-up menu, context menu, combo-box, or other text and/or graphical selection techniques.

Additionally, in an illustrative embodiment, identifiers may be verified as they are being supplied. For example, partial recognition may occur as an identifier is being entered. In an illustrative embodiment, identifier verification may also occur after the command is executed (e.g., after the "Enter" key is pushed). If the user identifier is unrecognized, the user may be prompted with suggested identifiers.

Figure 2:
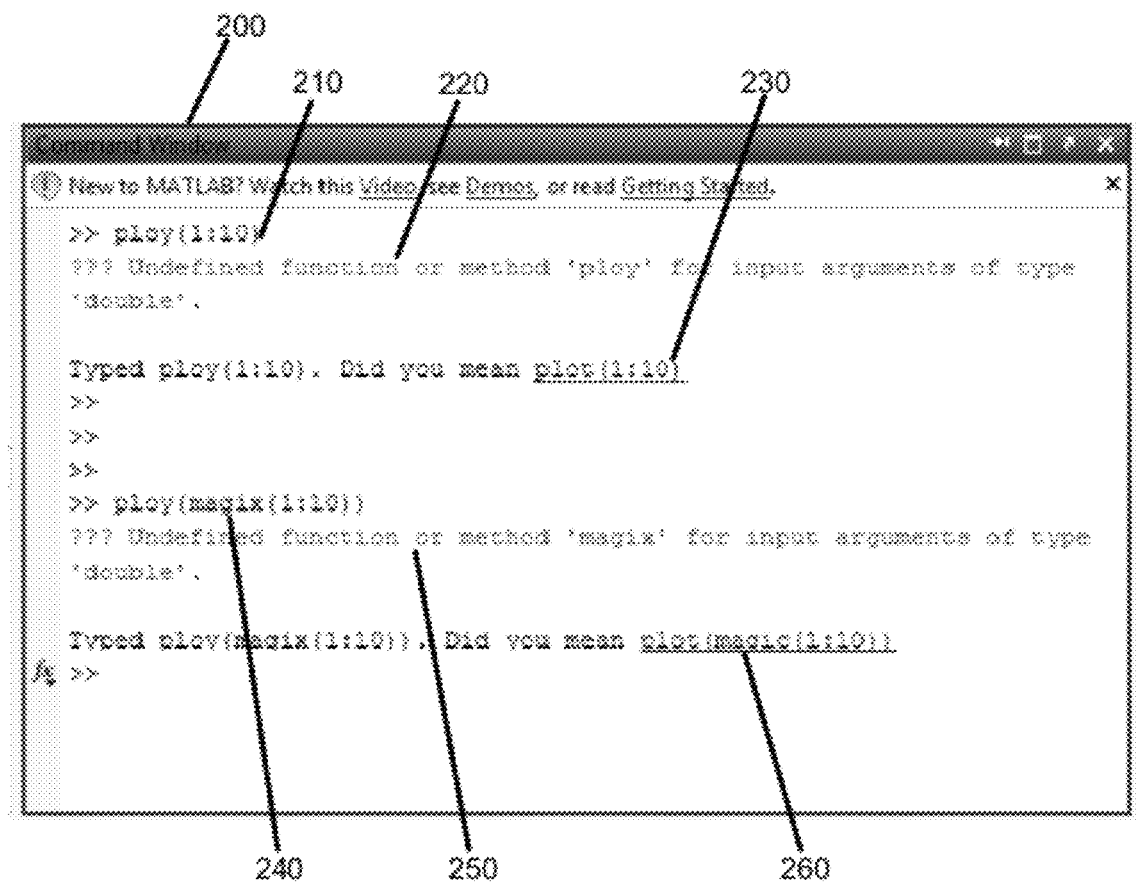
FIG. 2 illustrates an example screen-shot of a command-line interface configured to practice an illustrative embodiment.

FIG. 2 illustrates an example screen-shot of a command-line interface 200 configured to practice an illustrative embodiment. The example screen-shot of the command-line interface 200 depicts a user-entered string 210 (in this example, "ploy(1:10)") as being entered into the command-line interface 200. In this illustrative embodiment, the information processing system may recognize "ploy" in the user-entered string 210 as an unrecognized identifier and may display an error message 220.

The system may evaluate the probability of all the possible alternatives and display the suggested identifier with the highest probability of being the correct identifier (in this example, "plot" replaces "ploy" and displays "plot(1:10)") as a user-selectable option 230. An embodiment may display multiple suggested identifiers. The multiple suggested identifiers may be ranked according to their probabilities. User-selectable option 230 may be selected by, for example, using a mouse, other pointing device, or a keyboard. Concurrently or after selection of user-selectable option 230, the suggested identifier may be executed. An embodiment may allow a suggested identifier to be modified before execution. User modified command 240 may be executed. Alternatively, a user may choose not to select the user-selectable option 230 and may enter a different command into command-line interface 200. The user modified command 240 may also be an unrecognized command and an error message 250 may display. Again, the system may have evaluated the probability of all the possible alternatives and may display the suggested identifier or identifiers with the highest probability of being the correct identifier (in this example, "magic" replaces "magix" and displays "plot(magic(1:10))") as user-selectable option 260.

Example System

Figure 3:
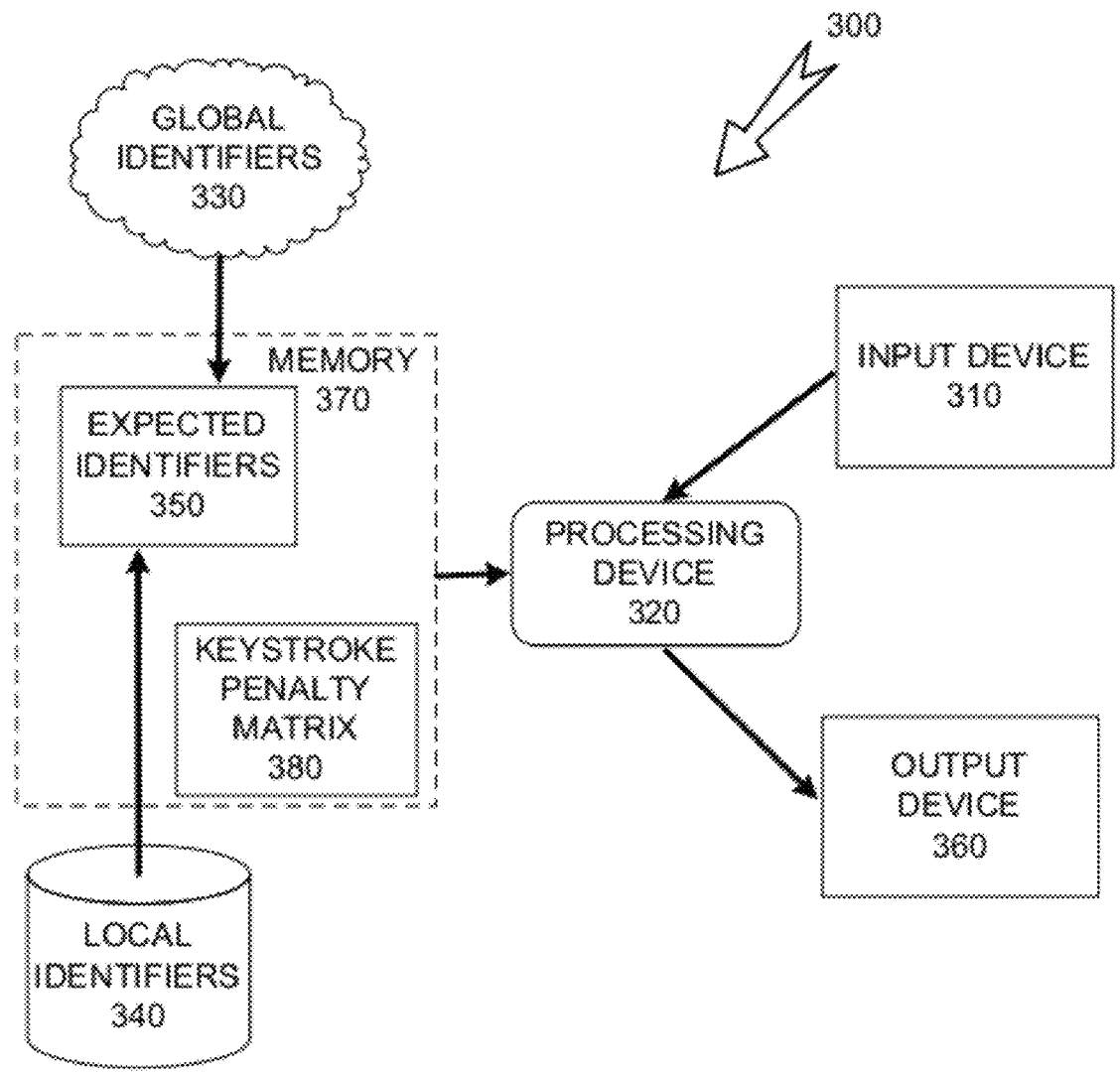
FIG. 3 illustrates an example processing system configured to practice an illustrative embodiment.

FIG. 3 illustrates an example processing system 300 configured to practice an illustrative embodiment. In the illustrative embodiment of FIG. 3, system 300 may include input device 310, processing device 320, output device 360, and memory 370.

Input device 310 may include a device for providing inputs to processing device 320. For example, input device may receive input from a user or another device. Input device 310 may include, for example, a keyboard, track ball, touch sensitive display, haptic device, microphone, etc.

Processing device 320 may include logic configured to execute computer-executable instructions that implement illustrative embodiments. The instructions may reside in memory 370. An example processing device that may be used includes the Pentium processor available from Intel Corporation, Santa, Clara, Calif.

Global identifiers 330 may include identifiers such as, but not limited to, global variables, functions, methods, and keywords used in a particular product line (e.g., but not limited to, MATLAB® by The MathWorks, Inc.).

Local identifiers 340 may include identifiers such as, but not limited to, local variables, user-defined variables, workspace variables, function names, method names, argument names, and/or file defined tokens, variables, scripts, methods and/or functions. User-defined variables may be identified in whatever manner processing system 300 allows users to define identifiers (e.g., but not limited to, a user-defined path to files where the names of the files become identifiers).

Expected identifiers 350 may include both global identifiers 330 and local identifiers 340. Identifiers in expected identifiers 350 may be associated with a frequency of occurrence. For example, commonly used commands (e.g., "cd") are used often and, therefore, may have a higher frequency of occurrence. The combination of expected identifiers 350 and associated frequency of occurrences may be called a prior probability distribution or as may be colloquially called by mathematicians "the prior."

Output device 360 may include a device for providing outputs from processing device 320. Output device 360 may include, for example, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc.

Memory 370 may be a computer-readable medium that may be configured to store instructions configured to implement illustrative embodiments of the invention. Memory 370 may be a primary storage accessible to processor 320 and may include a random-access memory (RAM) that may include RAM devices, such as, for example, Dynamic RAM (DRAM) devices, flash memory devices, Static RAM (SRAM) devices, etc.

Keystroke penalty matrix 380 may include a matrix (e.g., 128 by 128) of values. Each value may represent a mistyping penalty. Keystroke penalty matrix 380 is further described with respect to FIG. 7 below.

Input device 310 (e.g., keyboards, microphones, touch screens, haptic devices, etc.) may allow input of identifiers. Memory 370 may store expected identifiers 350 and keystroke penalty matrix 380. Global identifiers 330 and local identifiers 340 may also be stored in memory 370 or may be stored elsewhere.

Keystroke penalty matrix 380 may be used to calculate keystroke penalties between entered identifiers and expected identifiers 350. For example, a character key on a keyboard that is located near a character from an expected identifier may be penalized less than character keys that are further away.

Processor 320 may interpret the identifiers and detect entered identifiers that do not match the expected identifiers 350. When processor 320 detects an unrecognized identifier, processor 320 may, for expected identifiers 350, use a string matching algorithm (e.g., but not limited to, Needleman-Wunsch algorithm or Smith-Waterman algorithm) combined with keystroke penalty matrix 380, to calculate the probability that the user would type the unrecognized identifier given that the user intended to type an expected identifier.

For expected identifiers 350, processing device 320 may use Bayes theorem, for example, to calculate a second probability that the user intended to type that expected identifier given both, the frequency of occurrence of that expected identifier and the previous string matching probability result. Once this second probability is determined for the expected identifiers 350, expected identifiers that have a probability higher than a threshold value may be displayed on output device 360. Alternatively, the identifiers having the highest one, two, three, etc. probabilities may be displayed on output device 360. If desired, embodiments can be configured to order identifiers based on their respective probabilities, e.g., rank ordering identifiers.

Illustrative Processing

Figure 4:
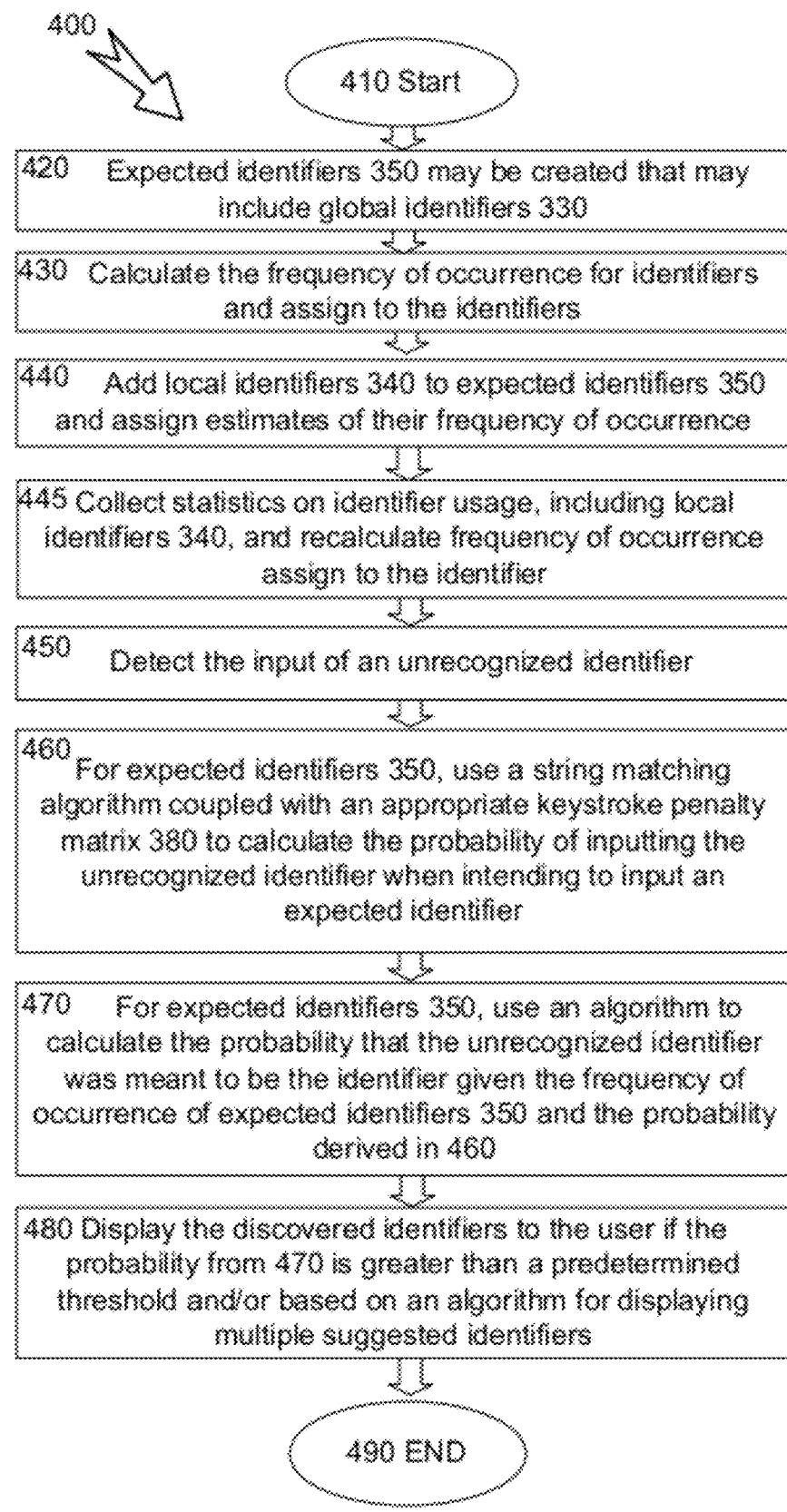
FIG. 4 illustrates an example flowchart describing processing performed by hardware in an illustrative embodiment.

FIG. 4 illustrates example flowchart 400 describing processing performed by hardware in an illustrative embodiment. A collection of expected identifiers 350 may be created and may include global identifiers 330 (step 420).

A frequency of occurrence may be calculated for global identifiers 330 using empirical usage data and the calculated frequency of occurrence may be assigned to each identifier (step 430).

Local identifiers 340 may be added to expected identifiers 350 (step 440). For example, local identifiers 340 may be assigned an appropriate estimate of the frequency of occurrence and may be added to expected identifiers 350. The expected identifiers 350 and the associated frequency of occurrences of the identifiers may be called a prior probability distribution or "the prior."

Statistics on usage of expected identifiers 350 may be collected (step 445). For example, statistics of usage for global identifiers 330 and local identifiers 340 may be collected in an exemplary embodiment. The statistics may be collected according to various criteria such as, per user, per workstation, per group, locally, globally, etc. The frequency of occurrence for expected identifiers 350 may be recalculated and assigned to expected identifiers 350.

Collection of usage statistics may provide a learning aspect which allows an illustrative embodiment to customize itself to particular usage characteristics. Collection of statistics and assignment of the recalculated frequency of occurrence may occur periodically (e.g., every minute, hour, week, month, etc.) or may occur in real-time and/or continuously. This feature may provide specific customization where different users may use various commands with more or less frequency.

An unrecognized identifier may be detected. Detection may occur by, for example, detecting the associated error when the identifier is executed (step 450).

The unrecognized identifier may be compared to expected identifiers 350 using, for example, a string matching algorithm and keystroke penalty matrix 380 to calculate the probability of inputting the unrecognized identifier when intending to input an expected identifier (step 460).

An algorithm (e.g., Bayes theorem) may be used to calculate the probability for expected identifiers 350, that the inputted value was intended to be the expected identifier given the probability of a match calculated from 460 and the frequency of occurrence calculated in 430, 440, and 445 (step 470).

The results of 470 may be analyzed (step 480). For example, an embodiment may determine that the probability calculated in step 470 exceeds a defined threshold value for one or more expected identifiers 350, then the expected identifier(s) may be displayed for selection. The threshold value may be user-defined which may increase or decrease the number of suggested identifiers displayed. Additional display algorithms may exist for displaying multiple suggested identifiers.

In one embodiment, the number of displayed suggested identifiers may vary depending on the determined probability that what was inputted was intended to be the identifier. For example, if the probability was 90% that what was entered was intended to be the identifier then only one value may be displayed. However, if, for example, two identifiers each had a 40% probability that they were intended to be the identifier, then both values may be displayed. Similarly, for example, if three identifiers each had a 30% probability that they were intended to be the identifier then all three values may be displayed. Identifiers with a low probability (e.g., but not limited to, less than 20%) may not be of value to the user and may cause unnecessary user confusion and therefore, may not be displayed. Alternatively, the identifiers having the highest one, two, three, etc. probabilities may be displayed on output device 360. From 480, flow may end at 490.

Figure 5:
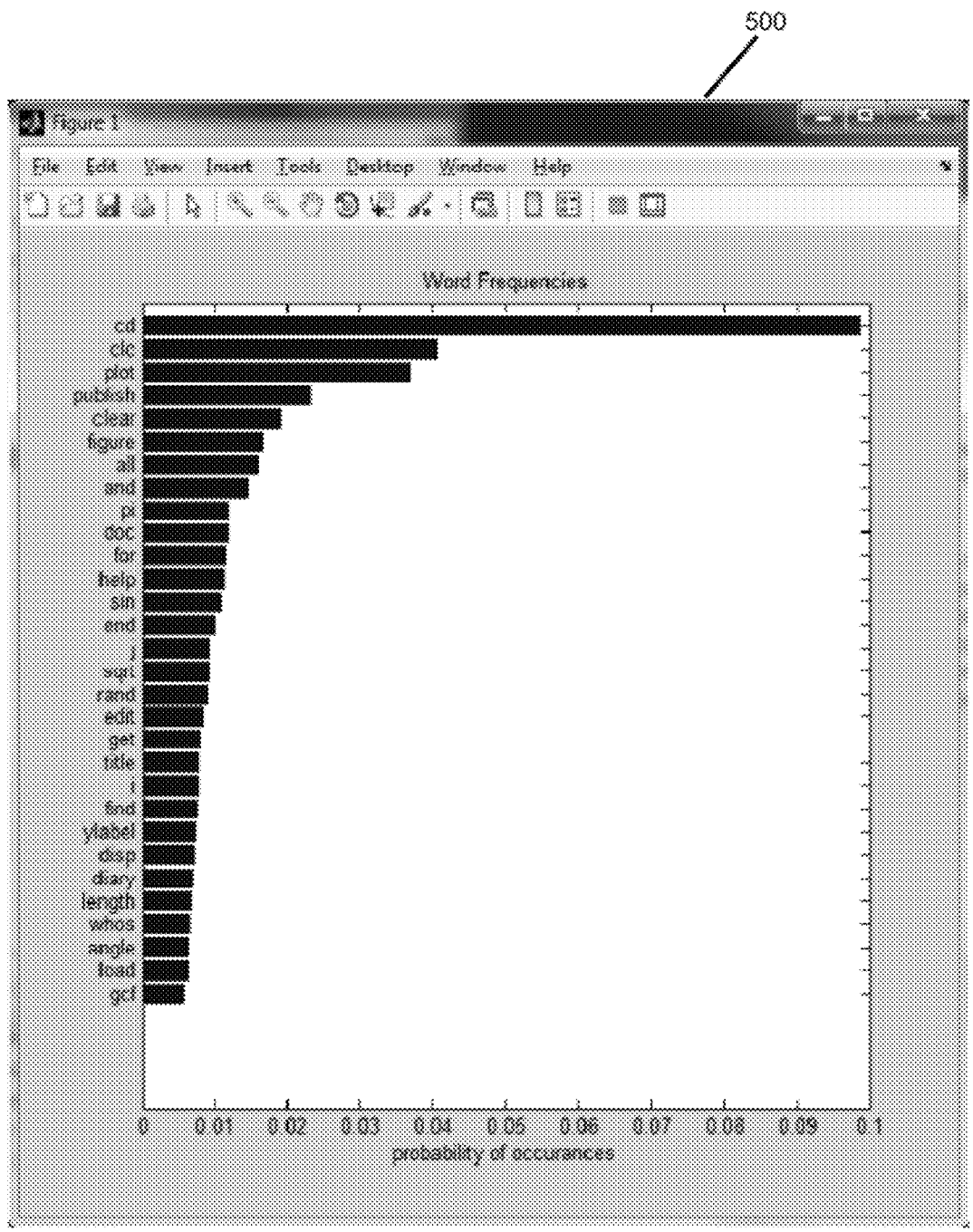
FIG. 5 illustrates a portion of an identifier frequency graph depicting the probability of occurrence of an example subset of identifiers in an illustrative embodiment.

FIG. 5 illustrates a portion of an example identifier frequency graph 500 depicting the probability of occurrence of a subset of identifiers in an illustrative embodiment. Identifier frequency graph 500 depicts a reduced set of expected identifiers from an illustrative embodiment. The full set of identifiers and corresponding probabilities of occurrence may vary considerably depending on the processing system used. Identifier frequency graph 500 depicts that the identifier "cd" occurring as an input string is significantly higher than, for example, the identifier "load." Identifier frequency graph 500 is a sample visual depiction of a subset of expected identifiers 350 of FIG. 3 and created in 430, 440, and 445 of FIG. 4.

Figure 6:
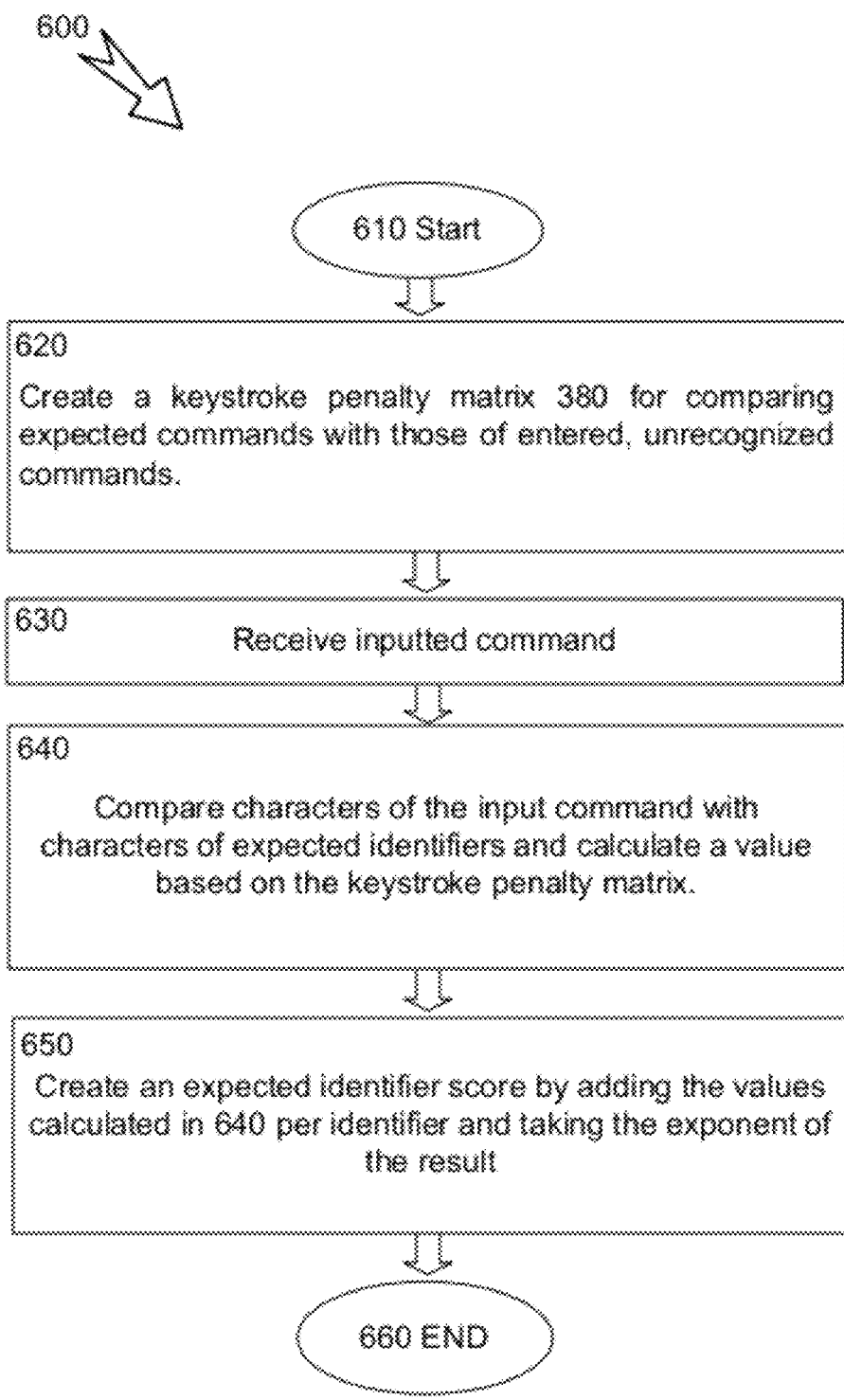
FIG. 6 illustrates an example flowchart describing processing of a penalty matrix performed by hardware in an illustrative embodiment.

FIG. 6 illustrates example flowchart 600 describing processing of keystroke penalty matrix 380 performed by hardware in an illustrative embodiment. The keystroke penalty matrix 380 may be used in block 460 of FIG. 4. Keystroke penalty matrix 380 may be created for comparing expected identifiers with those of entered, unrecognized commands (step 620).

Keystroke penalty matrix 380 may assign the log of a probability that the character is, for example, a match (i.e., the characters are the same), a case miss (i.e., the characters are the same except case (e.g., "a" to "A")), a close miss (i.e., where the characters are one key away in terms of physical distance on a keyboard (e.g., "g" to "h")), a miss (i.e., where the characters are over one key away in terms of physical distance on a keyboard (e.g., "a" to "p")), a gap open (i.e., where a non-matching character was inadvertently entered into the sequence), and/or a gap extend (i.e., where a non-matching character was inadvertently entered into the sequence after a gap open).

In an embodiment, the following examples assume that the expected identifier is "Hicklin." If the entered command was "Hicklin," then there was a match. If the entered command was "hicklin," then a case miss penalty may be charged (e.g., "h" not "H"). If the entered command was "Hickoin," then a close miss penalty may be charged (e.g., "o" not "l"). If the entered command was "Hicxlin," then a miss penalty may be charged (e.g., "x" not "l"). If the entered command was "HicXklin," then a gap open penalty may be charged (e.g., extra character "X"). If the command was "HicXYZklin," then there may be one gap open (e.g., extra character "X") and two gap extend penalties (e.g., extra characters "Y" and "Z"). If the command was "Hiclin," then there may be a gap penalty for the missing "k."

In an embodiment, example probabilities with a logarithmic value applied may include:

| | |
|---|---|
| Match = | log 10(0.969); |
| Case Miss = | log 10(0.010); |
| Close Miss = | log 10(0.010/6); |
| Miss = | log 10(0.001/120); |
| Gap Open = | log 10(0.005); |
| Gap Extend = | log 10(0.005); |

Although keystroke penalty matrix 380 is referred to as a "matrix," other data structures may be used.

An inputted command may be received (step 630).

The characters of the entered command may be compared with the characters of expected identifiers 350 (step 640). A penalty value may be calculated based on the keystroke penalty matrix 380 for the characters of expected identifiers 350.

Identifiers in expected identifiers 350 when compared character-to-character with the entered command, may be scored based on, for example, whether the two characters are a match, different cases, a close miss, a miss, and/or whether the spacing is incorrect.

A score may be calculated for expected identifiers 350 by adding the values calculated in 640 and then taking the exponent of the addition result (step 650).

FIG. 7 illustrates a portion of example keystroke penalty matrix 700 for depicting mistyping penalties in an illustrative embodiment. Illustrative keystroke penalty matrix 700 depicts a reduced set of possible keys from, for example, a 128 by 128 matrix. Each value in the matrix may represent a mistyping penalty. The 128 values on each row and column may represent characters which may include characters needed to enter a known identifier, for example. Illustrative keystroke penalty matrix 700 depicts keys "Q-E," which may be a subset of all keys. A keystroke penalty matrix used in an illustrative embodiment of the invention may include a matrix for all possible keys or a reduced set. The keystroke penalty matrix 700 depicts how keystroke mistakes may be penalized. For example, keys that are nearby may be penalized less than keys that are further away.

The character entered or entered value 710 may be, for example, a column identifier. The character of an expected identifier or the character a user meant to type 720 may be, for example, a row identifier. According to example keystroke penalty matrix 700, for example, an expected identifier that requires an "e," mistyping "w" may incur a penalty of 2, while mistyping "Q" may incur a much higher penalty of 5. In this case, "Q" is uppercase and further away from "e" on a standard QWERTY keyboard and, therefore, is less likely to be typed by accident.

In another illustrative embodiment, for example, the string "pkot" will have less penalty than "pqot" when compared to the valid MATLAB® command "plot" because "k" is immediately to the left of "l" on a standard QWERTY keyboard and "q" is further away from "l." Various rules may be incorporated into the penalty matrix depending on the particular information processing system. For example, the penalty for mismatched case may be increased or decreased depending on the particular processing system 300.

In one illustrative embodiment, keystroke penalty matrix 700 may be used in combination with a string matching algorithm such as the Needleman-Wunsch algorithm or Smith-Waterman algorithm, for example. The combination of a string matching algorithm and keystroke penalty matrix 700 may be employed as discussed regarding 460 of FIG. 4.

In an illustrative embodiment, a key may refer to a key on a keyboard, where the keyboard may be input device 310. A keyboard may be, for example, alphabetic, numeric, and/or symbolic. A keyboard may be, for example, a QWERTY keyboard, a Dvorak keyboard, a numeric-only keyboard, etc. The keys on the keyboard may be representative of characters such as, but not limited to, letters, symbols, and/or sounds in one or more languages. A key may be representative of a symbol that is not tied to a language (e.g. a mathematical symbol, a paragraph symbol, etc.). Other input devices may be used in place of a keyboard to practice the invention.

Example Software Implementation

FIGS. 8A and 8B illustrate illustrative software code 810 (FIG. 8A) and 820 (FIG. 8B) that may implement an illustrative embodiment of the invention. Example software code listing 820 is a continuation from software code listing 810. In an illustrative embodiment, software code 810 and 820 may be used to implement 620, 630, 640, and 650 of FIG. 6.

Figure 10:
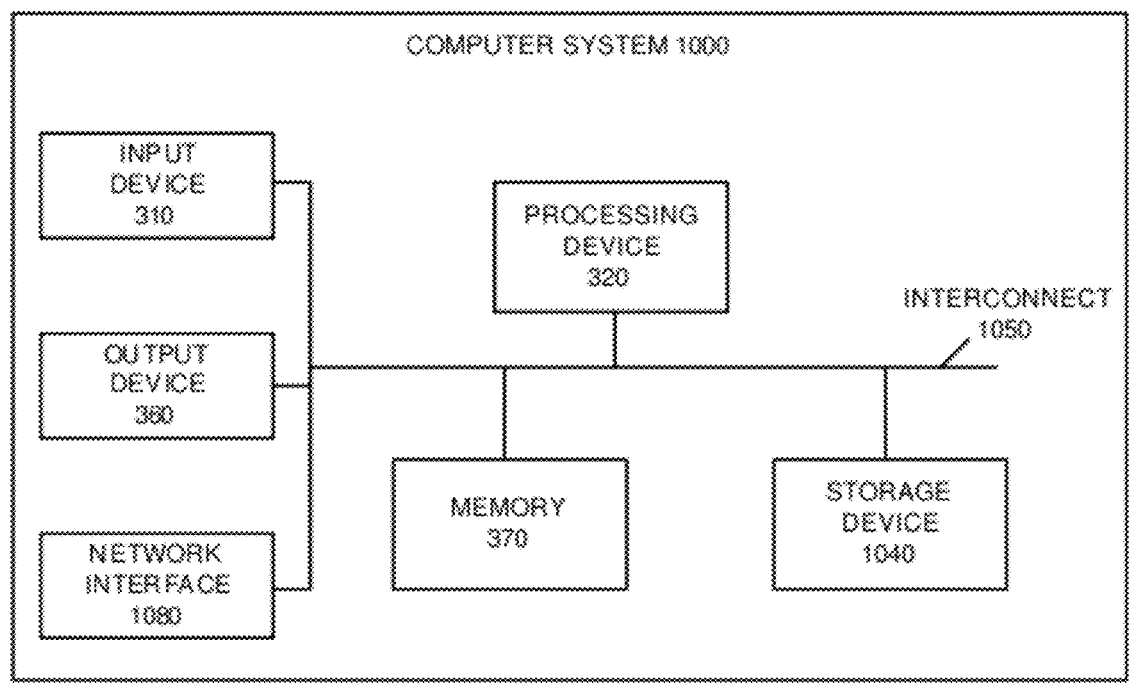
FIG. 10 illustrates an example of a computer system that may be configured to practice an illustrative embodiment.

Example software code 810 and 820 may be stored in memory 370 and/or storage device 1040 (FIG. 10). Example software code 810 and 820 are written in the MATLAB® by The MathWorks, Inc. language, but similar implementations may be written in other types of programming languages such as, but not limited to, C/C++, Fortran, Forth, ADA, Pascal, JavaScript, Python, C#, Java, Visual Basic, etc.

Example Distributed System

Figure 9:
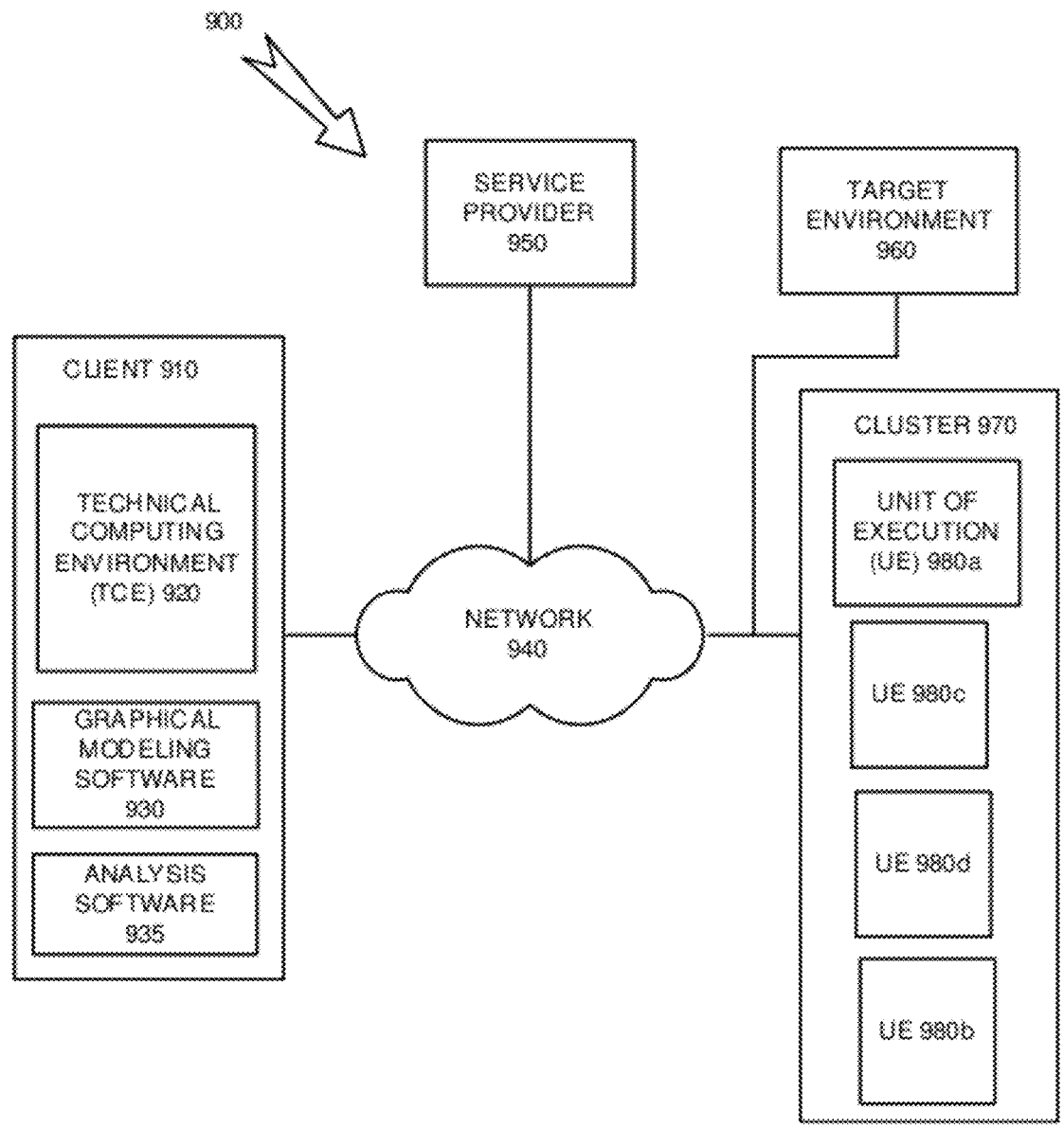
FIG. 9 illustrates a distributed environment that may be configured to practice an illustrative embodiment.

FIG. 9 illustrates distributed environment 900 that may be configured to practice an illustrative embodiment. Referring to FIG. 9, environment 900 may include a client 910, network 940, service provider 950, target environment 960 and cluster 970. Note that the distributed environment illustrated in FIG. 9 is just one example of a distributed environment that may be used. Other distributed environments may include additional devices, fewer devices, or devices in arrangements that differ from the arrangement of environment 900. For example, distributed environment 900 can be implemented as a computing cloud if desired.

Client 910 may include a device capable of sending and/or receiving information (e.g., data) to and/or from another device, such as target environment 960. Information may include any type of machine-readable information having substantially any format that may be adapted for use, e.g., in one or more networks and/or with one or more devices. The information may include digital information and/or analog information. The information may further be packetized and/or non-packetized. In an embodiment, client 910 may download data and/or code via network 940. For example, client 910 can download code for suggesting correct identifiers consistent with aspects of the invention.

Client 910 may be, for example, a desktop computer, a laptop computer, a client computer, a server computer, a mainframe computer, a personal digital assistant (PDA), a web-enabled cellular telephone, a smart phone, smart sensor/actuator, or another computation or communication device that executes instructions that enable the device to perform one or more activities and/or generate one or more results.

In an illustrative embodiment, client 910 may include a technical computing environment (TCE) 920, graphical modeling software 930 and analysis software 935. TCE 920 may include a graphical block diagram environment that may be used to execute models and manipulate the models in accordance with techniques described herein. In other illustrative embodiments, client 910 may include other components, applications, etc. Illustrative embodiments of TCE 920 may contain computer-executable instructions (e.g., code) and data that are configured to implement the TCE. The instructions may include instructions configured to implement graphical modeling software 920 and/or graphical analysis software 935. An example embodiment of the invention may be implemented in a TCE 910.

Modeling software 930 and analysis software 935 may be graphical, textual or a hybrid that includes both textual and graphical capabilities/features. Modeling software 930 may include computer-executable instructions that allow, e.g., a user to build and/or execute a model. For example, modeling software 930 may allow a user to build and execute a time-based model, a state-based model, an event-based model, a dataflow-based model, etc. An example embodiment of the invention may be implemented as part of modeling software 930.

Analysis software 935 may include computer-executable instructions that allow information in a model to be evaluated. Evaluating a model may include generating tests for the model that satisfy model coverage objectives, user-defined objectives, etc. In addition, evaluating a model may include proving various model properties and generating examples of violations of these properties. Moreover, evaluating a model may include analyzing the model, in accordance with techniques described herein. In an illustrative embodiment, analysis software 935 may include the Simulink® Design Verifier software which is available from The MathWorks, Inc. An example embodiment of the invention may be implemented as part of analysis software 935.

Network 940 may include any network capable of exchanging information between entities associated with the network, including, for example, client 910, service provider 950, target environment 960 and cluster 970. Exchanged information may include, for example, packet data and/or non-packet data. Implementations of network 940 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 940 may include various network devices, such as, for example, routers, switches, firewalls, servers, etc. Portions of network 940 may be wired (e.g., using wired conductors, optical fibers, etc.) and/or wireless (e.g., free-space optical (FSO), radio frequency (RF), acoustic transmission paths, etc.). Portions of network 940 may include a substantially open public network, such as the Internet. Portions of network 940 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

Service provider 950 may include code (e.g., software), logic (e.g., hardware or a combination of hardware and software), etc., that makes a service available to another device in distributed environment 900. Service provider 950 may include a server operated by an entity (e.g., an individual, a corporation, an educational institution, a government agency, etc.) that provides one or more services to a destination, such as client 910. The services may include software containing computer-executable instructions that may be executed, in whole or in part, by a destination, by service provider 950 on behalf of the destination, or some combination thereof. An example embodiment of the invention may be implemented as part of service provider 950.

For example, in an illustrative embodiment, service provider 950 may provide one or more subscription-based services to various customers via network 940. These services may be accessed by the customer (e.g., via client 910). Service provider 950 may limit access to certain services based on, e.g., a customer service agreement between the customer and service provider 950. The service agreement may allow the customer to access services that allow the customer to build and/or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources used, network bandwidth used, etc.

Target environment 960 may include a device that receives information from client 910, service provider 950, or cluster 970. For example, target environment 960 may receive executable code from client 910, where the executable code allows target environment to perform an operation when the code is executed. Client 910 may have generated the executable code using TCE 920, graphical modeling software 930, and/or a code generator (not shown in FIG. 9).

Cluster 970 may include a number of processing resources that perform processing on behalf of another device, such as client 910, service provider 950 and/or target environment 960. Cluster 970 may include logic that manages and/or coordinates the operation of multiple processing resources. For example, cluster 970 may send data to and/or receive results from these processing resources. In an illustrative embodiment, cluster 970 may include units of execution (UEs) 980a, b, c, and d (collectively UEs 980) that may perform processing on behalf of client 910 and/or another device, such as service provider 950. An example embodiment of the invention may be implemented on one or more UEs 980.

UEs 980 may include hardware, software, or hybrid logic that perform processing operations on behalf of TCE 920. For example, in an illustrative embodiment UEs 980 may parallel process portions of a graphical model created by user of client 910. This parallel processing may include performing analysis on the model, parsing the model into portions, and/or aggregating results from respective UEs 980 into a single result for display to a user at client 910. UEs 980 may reside on a single device or chip or on multiple devices or chips. For example, UEs 980 may be implemented in a single application specific integrated circuit (ASIC) or in multiple ASICs Likewise, UEs 980 can be implemented in a single computer system using virtualization techniques. Other examples of UEs 980 may include field programmable gate arrays (FPGAs), complex programmable logic devices (CPLDs), application specific instruction-set processors (ASIPs), microprocessors, etc.

A TCE 920 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, the TCE 920 may include a dynamically typed language that can be used to express problems and/or solutions in mathematical notations familiar to those of skill in the relevant arts. For example, the TCE 920 may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

A TCE 920 may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

A TCE 920 may further provide mathematical functions and/or graphical tools (e.g., for creating plots, surfaces, images, volumetric representations, etc.). In one implementation, the TCE 920 may provide these functions and/or tools using toolboxes (e.g., toolboxes for signal processing, image processing, data plotting, parallel processing, optimization, etc.). In another implementation, the TCE 920 may provide these functions as block sets (e.g., an optimization block set). In still another implementation, the TCE 920 may provide these functions in another way, such as via a library, etc. The TCE 920 may be implemented as a text based environment, a graphically based environment, or another type of environment, such as a hybrid environment that is both text and graphically based.

Example software code 810 and 820 may be complied and processed by processing device 320 and implemented in TCE 920.

Illustrative Computing Architecture Example System

FIG. 10 illustrates an example of a computer system 1000 that may be configured to practice an illustrative embodiment of the invention. For example, computer system 1000 may be used to implement client 910, service provider 950, target environment 960, etc. Computer system 1000 may include processing device 320, memory 370, storage device 1040, input device 310, output device 360, interconnect 1050 and network interface 1080. For example, output device 360 may include logic configured to output information from computer system 1000. Processing device 320, memory 370, input device 310, and output device 360 may be configured and implemented as discussed in FIG. 3.

Storage device 1040 may include a magnetic disk and/or optical disk and its corresponding drive for storing information and/or instructions.

Interconnect 1050 may include logic that operatively couples components of computer system 1000 together. For example, interconnect 1050 may allow components to communicate with each other, may provide power to components of computer system 1000, etc. In an illustrative embodiment of computer system 1000, interconnect 1050 may be implemented as a bus.

Network interface 1080 may include logic configured to interface computer system 1000 with a network, e.g., network 940, and may enable computer system 1000 to exchange information with other entities connected to the network, such as, for example, service provider 950, target environment 960 and cluster 970. Network interface 1080 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 1000 to any type of network.

It should be noted that illustrative embodiments may be implemented using some combination of hardware and/or software. It should be further noted that a computer-readable medium that includes computer-executable instructions for execution in a processor may be configured to store illustrative embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an illustrative embodiment of the invention.

A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processing device 320. A hardware unit of execution may also be a programmable device, such as a field programmable gate array (FPGA), an application specific integrated circuit (ASIC), a digital signal processor (DSP), etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment [e.g., MATLAB® software], a worker, a lab, etc.) that performs and/or participates in parallel programming activities. For example, a software unit of execution may perform and/or participate in parallel programming activities in response to receipt of a program and/or one or more portions of the program. In an illustrative embodiment, a software unit of execution may perform and/or participate in substantially any type of parallel programming using one or more hardware units of execution. Illustrative embodiments of a software unit of execution may support one or more threads and/or processes when performing processing operations.

Alternative Illustrative Embodiments

An alternative illustrative embodiment may implement a TCE 920 using one or more text-based products. For example, a text-based TCE 920, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Other illustrative embodiments may implement a TCE 920 in a graphically-based TCE 920 using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; or aspects of a Unified Modeling Language (UML) or SysML environment.

Another alternative illustrative embodiment may be implemented in a language that is compatible with a product that includes a TCE 920, such as one or more of the above identified text-based or graphically-based TCE's 920. For example, MATLAB® (a text-based TCE 920) may use a first command to represent an array of data and a second command to transpose the array. Another product, that may or may not include a TCE 920, may be MATLAB®-compatible and may be able to use the array command, the array transpose command, or other MATLAB® commands. For example, the other product may use the MATLAB® commands to suggest proper identifiers when an unrecognized identifier is presented.

Yet another alternative illustrative embodiment may be implemented in a hybrid TCE 920 that combines features of a text-based and graphically-based TCE 920. In one implementation, one TCE 920 may operate on top of the other TCE 920. For example, a text-based TCE 920 (e.g., MATLAB®) may operate as a foundation and a graphically-based TCE 920 (e.g., Simulink) may operate on top of MATLAB® and may take advantage of text-based features (e.g., commands) to provide a user with a graphical user interface and graphical outputs (e.g., graphical displays for data, dashboards, etc.).

CONCLUSION

Implementations may provide devices and techniques that implement one or more algorithms to identify and display the most likely intended identifier. A first algorithm may use a string matching algorithm combined with a keystroke penalty matrix to determine the probability for each identifier of a user typing the unrecognized identifier when they intended to type the identifier from the list. A second algorithm may use a form of Bayes' theorem with the probability of occurrence for each identifier and the results of the first algorithm to further determine the probability the user intended to type the identifier, for each identifier. The highest results may be transferred and/or displayed to the user for selection or automatically inserted if the probability is high enough.

Another illustrative embodiment may allow a user to modify the suggested identifier prior to execution of the suggested identifier.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 4 and 6, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 3, 9, and 10. depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software. No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and/or subheadings used herein are used to segment this patent application into portions to facilitate the readability of the application. These headings and/or subheadings are not intended to define or limit the scope of the invention disclosed and/or claimed in this patent application.

The scope of the invention is defined by the claims and their equivalents.

What is claimed is:

1. One or more tangible non-transitory computer-readable storage media for storing computer-executable instructions executable by processing logic, the media storing one or more instructions for:
   creating expected identifiers in a computing environment;
   calculating frequencies of occurrence of the expected identifiers in the computing environment;
   detecting one or more unrecognized identifiers received by the computing environment;
   calculating first numerical scores using a string matching algorithm and a keystroke penalty matrix, where the first numerical scores indicate that one or more unrecognized identifiers were provided to the computing environment in place of one or more expected identifiers;
   calculating second numerical scores using the first numerical scores, the frequencies of occurrence of the one or more expected identifiers, and Bayes theorem, where the second numerical scores indicate that one or more unrecognized identifiers were intended to include one or more expected identifiers; and
   selecting one or more expected identifiers based on the second numerical scores.

2. The one or more tangible non-transitory computer-readable storage media of claim 1, wherein detecting one or more unrecognized identifiers occurs when a command is evaluated.

3. The one or more tangible non-transitory computer-readable storage media of claim 1, wherein the string matching algorithm includes at least one of:
   Needleman-Wunsch algorithm; or
   Smith-Waterman algorithm.

4. The one or more tangible non-transitory computer-readable storage media of claim 1, wherein using the keystroke penalty matrix associates a penalty score to characters identified with nearby keys on a keyboard that is smaller than a penalty score associated with keys located further away from an entered character on the keyboard.

5. The one or more tangible non-transitory computer-readable storage media of claim 1, wherein the expected identifiers comprise at least one of: commands, variables, workspace variables, local variables, function names, method names, argument names, tokens stored in files, keywords, properties, properties of an object, or lexical tokens.

6. The one or more tangible non-transitory computer-readable storage media of claim 1, wherein the frequencies of occurrence are determined based on usage data for expected identifiers.

7. The one or more tangible non-transitory computer-readable storage media of claim 1, wherein selecting one or more expected identifiers based on the second numerical scores further comprises:
   choosing one or more expected identifiers based on a threshold value for the second numerical scores.

8. The one or more tangible non-transitory computer-readable storage media of claim 1, further comprising:
   displaying the selected one or more expected identifiers.

9. The one or more tangible non-transitory computer-readable storage media of claim 8, wherein displaying the selected one or more expected identifiers further comprises:
    depicting the selected one or more expected identifiers as a user-selectable option;
    receiving an indication of a user selection of the user-selectable option; and applying the user-selected option.

10. The one or more tangible non-transitory computer-readable storage media of claim 9, wherein applying the user-selected option further comprises:
    displaying the user-selected option;
    receiving modifications to the user-selected option; and
    executing the modified user-selected option.

11. The one or more tangible non-transitory computer-readable storage media of claim 10, wherein displaying the user-selected option occurs on a command-line.

12. The one or more tangible non-transitory computer-readable storage media of claim 1, further comprising:
    transmitting the selected one or more expected identifiers to a second computing environment.

13. The one or more tangible non-transitory computer-readable storage media of claim 1, wherein the expected identifiers include global identifiers and local identifiers, the global identifiers include at least one of global variables, global functions, global methods, or global keywords, and the local identifiers include at least one of local variables, local functions, or local scripts.

14. The one or more tangible non-transitory computer-readable storage media of claim 1, further comprising:
    adding additional expected identifiers to the computer environment; and
    calculating the frequencies of occurrence of the additional expected identifiers.

15. One or more tangible non-transitory computer-readable storage media for storing computer-executable instructions executable by processing logic, the media storing one or more instructions for:
    downloading the instructions of claim 1 to a computing environment, which when executed by the computing environment causes the computing environment to perform operations comprising the downloaded instructions.

16. One or more tangible non-transitory computer-readable media holding computer-executable instructions using a distributed environment, the media holding one or more instructions for:
    performing the instructions of claim 1 in a distributed environment.

17. One or more tangible non-transitory computer-readable storage media for storing computer-executable instructions executable by processing logic, the media storing one or more instructions for:
    creating a keystroke penalty matrix by performing a first operation on keystroke mistype probabilities in a computing environment;
    receiving textual input in the computing environment;
    calculating initial scores for expected identifiers in the computing environment, the calculating the initial scores comprising:
        performing a first operation on the initial scores, where the first operation includes:
            comparing the textual input and the expected identifiers to the keystroke penalty matrix; and
        calculating a final score for the expected identifiers, the calculating a final score comprising:
            performing a second operation on the initial scores in the computing environment, the second operation using Bayes theorem.

18. The one or more tangible non-transitory computer-readable storage media of claim 17, wherein calculating the initial scores comprises:
    comparing keystrokes from the textual input with keystrokes of the expected identifiers using the penalty matrix;
    obtaining penalty numerical values based on the comparing; and
    determining the initial scores using the penalty numerical values.

19. The one or more tangible non-transitory computer-readable storage media of claim 17, wherein the first operation includes a log function and the second operation is an exponentiating function.

20. The one or more tangible non-transitory computer-readable storage media of claim 17, wherein the keystroke mistype probabilities includes at least one of the probability of typing: a match, an incorrect case, a key close to an intended key, or a key miss.

21. A computer-implemented method comprising:
    creating expected identifiers in a computing environment by one or more processors;
    calculating frequencies of occurrence of the expected identifiers in the computing environment by the one or more processors;
    identifying one or more unrecognized identifiers in the computing environment by the one or more processors;
    calculating first numerical values in the computing environment by the one or more processors, where the first numerical values:
        indicate probabilities of inputting one or more unrecognized identifiers when intending to input one or more expected identifiers, and
        are calculated using:
            a string matching algorithm, and
            a penalty matrix;
    calculating second numerical values, where the second numerical values:
        indicate probabilities that one or more unrecognized identifiers were intended to be one or more expected identifiers, and
        are calculated using:
            a first theorem including Bays theorem,
            the frequencies of occurrence of the one or more identifiers, and
            the entries in the first plurality of numerical values; and
    selecting one or more expected identifiers in the computing environment by the one or more processors based on the second numerical values.

22. The method of claim 21, wherein the string matching algorithm is based on one of:
    Needleman-Wunsch algorithm; or
    Smith-Waterman algorithm.

23. A computer-implemented method, the method comprising:
    downloading software to a computing environment, which when executed by the computing environment causes the computing environment to perform operations comprising the method of claim 21.

24. A computer-implemented method, the method comprising:
    performing the method of claim 21 in a distributed environment.

25. A system comprising:
a storage device;
an input device; and
a processor configured to:
  identify expected identifiers from the storage device;
  calculate frequencies of occurrence for the expected identifiers;
  receive a command from the input device;
  identify the command as including one or more unrecognized identifiers;
  compute first numerical values using a string matching algorithm and a keystroke penalty matrix, where the first numerical values:
    indicate probabilities of inputting one or more unrecognized identifiers when one or more expected identifiers were mistyped;
  compute second numerical values, where the second numerical values:
    indicate probabilities that one or more unrecognized identifiers were one or more mistyped expected identifiers, and
    are calculated using:
      the first numerical values,
      the frequencies of occurrence for the one or more expected identifiers, and
      a second algorithm using Bayes theorem; and
  identify one or more expected identifiers as the one or more unrecognized identifiers based on the second numerical values in the computing environment.

26. The system of claim 25, wherein the string matching algorithm is based on one of:
Needleman-Wunsch algorithm; or
Smith-Waterman algorithm.

* * * * *

UNITED STATES PATENT AND TRADEMARK OFFICE
CERTIFICATE OF CORRECTION

PATENT NO. : 8,346,793 B1  
APPLICATION NO. : 13/074717  
DATED : January 1, 2013  
INVENTOR(S) : Joe Hicklin Page 1 of 1

It is certified that error appears in the above-identified patent and that said Letters Patent is hereby corrected as shown below:

In the Claims:

At Claim 21, column 16, line 46, replace "Bays" with --Bayes--.

Signed and Sealed this  
Ninth Day of September, 2014

Michelle K. Lee  
*Deputy Director of the United States Patent and Trademark Office*